(12) United States Patent
Hoang et al.

(10) Patent No.: US 7,711,044 B1
(45) Date of Patent: May 4, 2010

(54) NOISE REDUCTION SYSTEMS AND METHODS

(75) Inventors: Dzung Hoang, Austin, TX (US);
Toshihiro Horie, San Jose, CA (US);
Atul Apte, Sunnyvale, CA (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1538 days.

(21) Appl. No.: 11/013,963

(22) Filed: Dec. 16, 2004

Related U.S. Application Data

(63) Continuation-in-part of application No. 10/045,894, filed on Oct. 29, 2001, now abandoned.

(51) Int. Cl.
*H04B 1/66* (2006.01)
*H04B 1/69* (2006.01)

(52) U.S. Cl. ........................ 375/240; 382/275

(58) Field of Classification Search ................. 382/254, 382/263, 266, 275, 264, 300; 348/402.1, 348/403.1, 412.1, 428.1, 431.1, 439.1, 452, 348/578, 448, 559, 620; 375/240.16, 240.12, 375/240.02, 240.03
See application file for complete search history.

(56) References Cited

U.S. PATENT DOCUMENTS

| | | | |
|---|---|---|---|
| 5,557,330 A | 9/1996 | Astle | 348/394 |
| 5,799,111 A * | 8/1998 | Guissin | 382/254 |
| 5,974,181 A * | 10/1999 | Prieto | 382/232 |
| 6,037,986 A | 3/2000 | Zhang et al. | 348/409 |
| 6,381,279 B1 | 4/2002 | Taubman | 375/240.18 |
| 6,408,104 B1 * | 6/2002 | Lim et al. | 382/275 |
| 6,690,729 B2 | 2/2004 | Hayashi | 275/240.16 |
| 7,024,044 B2 * | 4/2006 | Bruna et al. | 382/239 |
| 2001/0012325 A1 | 8/2001 | Kobayashi et al. | 375/240.26 |
| 2003/0095594 A1 * | 5/2003 | Laksono et al. | 375/240.03 |
| 2004/0046754 A1 * | 3/2004 | Mayer et al. | 345/204 |
| 2006/0256861 A1 * | 11/2006 | Laksono et al. | 375/240.03 |

OTHER PUBLICATIONS

Utility U.S. Appl. No. 10/045,894, dated Oct. 29, 2001.
Sung Deuk Kim and Jong Beom Ra, "Efficient block-based video encoder embedding a Wiener filter for noisy video sequences," J.Vis. Commun. Image R. 14 (2003) 22-40, www.ComputerScienceWeb.com.
B.C. Song and K.W. Chun, "Motion-compensated temporal filtering for denoising in video encoder," Electronics Letters Jun. 24, 2004, vol. 40, No. 13.

* cited by examiner

*Primary Examiner*—Behrooz Senfi
(74) *Attorney, Agent, or Firm*—DLA Piper LLP (US)

(57) ABSTRACT

Embodiments of noise reduction systems and methods are disclosed. One method embodiment, among others, comprises transforming a residual signal to produce transform coefficients, and applying the transform coefficients to a quantization matrix and a configurable gain matrix to provide a frequency-selective weighting of the transform coefficients having a gain that is sensitive to noise levels.

23 Claims, 6 Drawing Sheets

NOISE REDUCTION SYSTEMS AND METHODS

CROSS-REFERENCE TO RELATED APPLICATIONS

This application is a continuation in part of U.S. utility application entitled, "System and Method For Automatically Reducing Noise For Video Encoding," having Ser. No. 10/045,894, filed Oct. 29, 2001 now abandoned, which is incorporated by reference herein in its entirety.

BACKGROUND OF THE INVENTION

1. Field of the Invention

The present disclosure generally relates to video encoding, and, more particularly, is related to the reduction of noise for video encoding.

2. Related Art

With advancements in technology, significant advances have been made in video processing technology. Analog video processing, which provides limited compression through typical single scan-line or one-dimensional ("1-D") processing, has been surpassed by more efficient multiple scan-line or two-dimensional ("2-D") digital video processing. Two-dimensional digital video processing has been surpassed by horizontal, vertical and temporal or three-dimensional ("3-D") digital video processing. Even MPEG-1, which was once the predominant mainstream 3-D video codec standard, has also recently been surpassed by the more versatile and higher-bit-rate-capable MPEG-2. Presently, MPEG-2 is the predominant mainstream compression standard.

As is known in the art, video recording is susceptible to different degrees and categories of noise that negatively affects video during compression and encoding. Samples of such noise include impulsive noise, such as, but not limited to, spikes, high contrast glitches, and "salt-n-pepper effect." Another sample of such noise includes Gaussian-distributed white noise, such as, but not limited to, thermal noise and "snow," which may arise from cable ingress, interference in an analog section of a digitizer utilized during video encoding, or other phenomena.

Not only does noise degrade picture quality directly by virtue of its visual appearance, but the presence of noise degrades the quality of compressed video indirectly because, as is known in the art, an appreciable fraction of bit rate is consumed to compress the noise. This leads to two situations. First, less bit rate is readily available to compress the real signal, resulting in increased compression impairments. Second, as is known in the art, compressed noise often has a more disturbing appearance than uncompressed noise. Thus, it is desirable to remove video noise prior to compression, particularly in situations where it is desired to minimize the bit rate.

Digital video noise can be removed by a variety of known digital processing techniques such as, but not limited to, finite impulse response (FIR) linear spatial filters, nonlinear spatial filters of various types, temporal filters, and even spatio-temporal filters. The temporal filter can take many forms, however, a typical temporal filter utilizes a motion-detector to moderate a recursive (infinite impulse response (IIR)) filter, which blends each pixel from a current image with a spatially co-located pixel from a previously filtered image. A large variety of noise reduction systems can be designed with different configurations of these basic components. Such noise reduction systems typically are set to operate in a static mode, in the sense that the noise characteristics are assumed not to change over time. The settings are set based on user input or based on offline (not real-time) measurements or calculations of the digital video noise. However, in a real environment, noise characteristics change over time or from video scene to video scene. Therefore, static noise reduction methods are insufficient, especially in systems such as consumer digital video recorders in which a user is not always present to control the recorder settings to compensate for changes in noise sources that may comprise widely varying noise characteristics.

Furthermore, without additional controls, the classical motion-detecting temporal filter with a simple motion detector has difficulty separating moving objects from noise, and thus cannot always use the best noise reduction setting. Specifically, in certain scenes, the classical motion-detecting temporal filter will filter too little, leaving more noise than necessary. Alternatively, in other scenes, the temporal filter may filter too much, visibly smearing moving objects or creating "ghosts," which appear as attenuated copies of moving objects trailing behind objects as they move within a video.

SUMMARY

Preferred embodiments of noise reduction systems and methods are disclosed. One method embodiment, among others, comprises transforming a residual signal to produce transform coefficients, and applying the transform coefficients to a quantization matrix and a configurable gain matrix to provide a frequency-selective weighting of the transform coefficients having a gain that is sensitive to noise levels.

One system embodiment, among others, comprises an encoder comprising quantization logic configured with a quantization matrix and a gain matrix that is configurable based on gain and shape parameters, the quantization logic configured to apply transform coefficients to the quantization matrix and the gain matrix to generate a frequency-selective weighting of the transform coefficients having a gain that is sensitive to noise levels.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the disclosed systems and methods. In the figures, like reference numerals designate corresponding parts throughout the different views.

DETAILED DESCRIPTION

Disclosed herein are various embodiments of noise reduction systems and methods (herein, noise reduction system). Such a noise reduction system may employ one or more of motion adaptive temporal filtering, motion compensated temporal filtering, and noise measurement to perform noise reduction in video images. With regard to motion compensated temporal filtering, an embodiment of the noise reduction system performs motion compensated temporal filtering, wherein a block of discrete cosine transform (DCT) coefficients of motion compensated macroblocks are weighted according to one or more predefined 2-dimensional (2-D) weighting functions. The weighting functions comprise two parameters: one parameter controlling the shape and the other parameter controlling the magnitude. In one embodiment, the shape parameter may be user configurable, whereas the magnitude parameter can be calculated based upon a noise level measurement process as described below.

Figure 1:
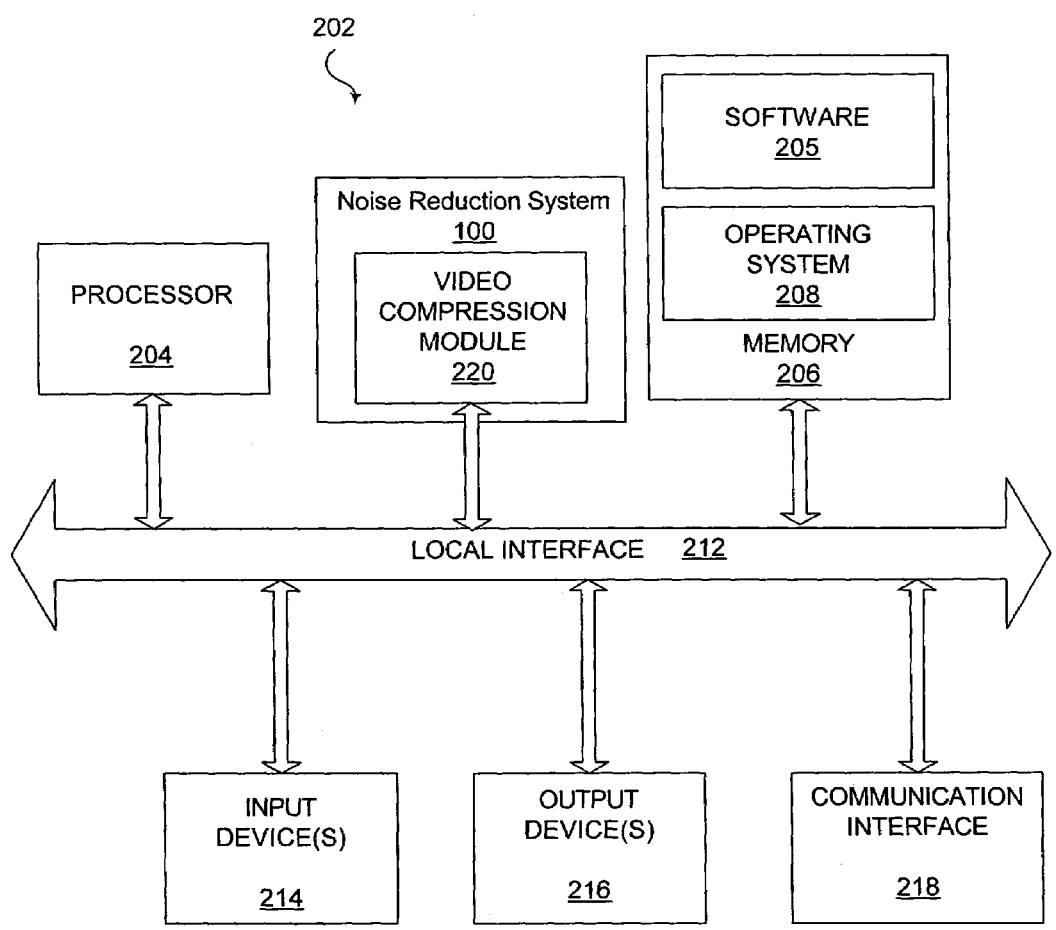
FIG. 1 is a typical computer or processor-based system in which an embodiment of a noise reduction system may be provided.

In the description that follows, an exemplary computer system is described in conjunction with FIG. 1, with the various components of the noise reduction system described in association with FIGS. 2-4 and 6. FIG. 5 is a graph that provides an exemplary illustration of a family of curves parameterized by temporal filter level $\chi$ from which one curve is to be selected based on an estimated noise level. An exemplary user interface used in one embodiment to adjust a shape and gain parameter is described in association with FIG. 7.

Although the noise reduction system will be described in the context of an MPEG video encoder that is modified to include prefiltering functionality in the DCT domain, other embodiments are anticipated such as separating prefiltering functionality and the encoding process. Similarly, other codec standards are also anticipated.

FIG. 1 is a typical computer or processor-based system 202 in which an embodiment of a noise reduction system 100 may be provided. The computer system 202 of FIG. 1 generally comprises a processor 204 and a memory 206, having an operating system 208. Herein, the memory 206 may be any combination of volatile and nonvolatile memory elements, such as random access memory or read only memory. The processor 204 accepts instructions and data from the memory 206 over a local interface 212, such as a bus(es). The computer system 202 also includes an input device(s) 214 and an output device(s) 216. Examples of input devices 214 may include, but are not limited to a serial port, a scanner, or a local access network connection. Examples of output devices 216 may include, but are not limited to, a video display, a Universal Serial Bus, or a printer port. Generally, this system may run any of a number of different platforms and operating systems, including, but not limited to, Windows NTT™, Unix™, or Sun Solaris™ operating systems.

A video compression module 220 is located within the computer system 202 and is connected to the system via the local interface 212. Noise reduction is performed by the present noise reduction system 100 via use of the video compression module 220 and logical devices and/or elements (e.g., software, hardware, or a combination of software and hardware) located therein. The noise reduction system 100, in some embodiments, may also comprise other components, such as processor 204, memory 206, among others. Also, the noise reduction system 100 may omit some components of the video compression module 220 in some embodiments. Further description of the video compression module 220 is provided hereinbelow with reference to FIG. 2. A communication interface 218 is also located within the computer system 202 for receiving video that is transmitted to the computer system 202.

Functionality for defining performance by the noise reduction system 100, which is not defined and executed by the video compression module 220, is defined by software 205 that resides in memory 206. Of course, other functions for typical computer operation are defined within the memory 206 as well. Functionality performed by the noise reduction system 100 is defined hereinafter in further detail.

The noise reduction system 100 can be implemented in software, firmware, hardware, or a combination thereof. Specifically, a portion of the system may be implemented in software that is executed by a computer, for example, but not limited to, a server, a personal computer, workstation, minicomputer, or mainframe computer.

The software-based portion of the noise reduction system 100, which may comprise an ordered listing of executable instructions for implementing logical functions, can be embodied in any computer-readable medium for use by, or in connection with, an instruction execution system, apparatus, or device such as a computer-based system processor containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

In addition, it should be noted that the noise reduction system 100 need not be located within a computer system such as that illustrated by FIG. 1. Instead, the noise reduction system 100 may be provided within an application specific integrated circuit (ASIC), wherein the ASIC is located on a circuit board. Further, the present system 100 may be utilized in combination with the compression of any type of video.

Figure 2:
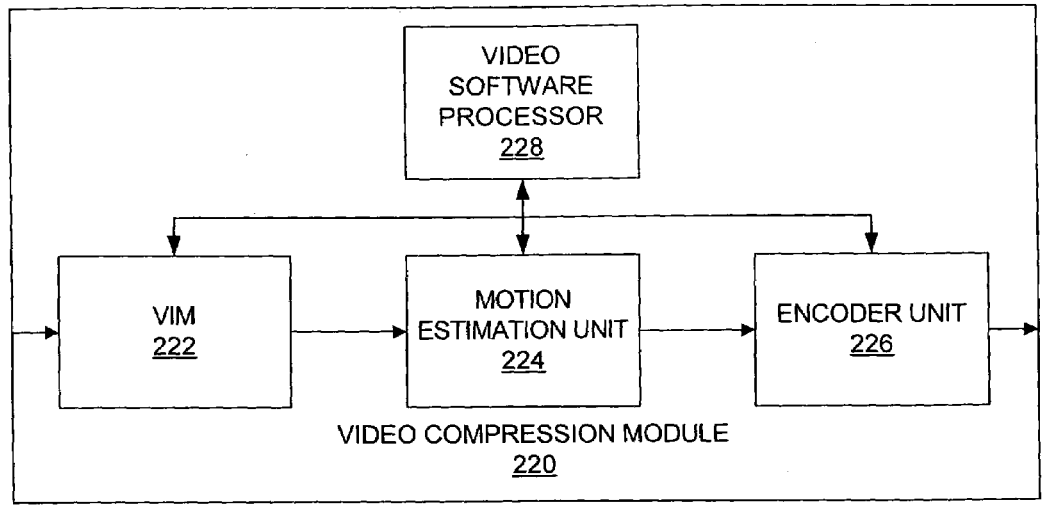
FIG. 2 is a block diagram illustrating an embodiment of a video compression module of the noise reduction system shown in FIG. 1.

FIG. 2 is a block diagram further illustrating the video compression module 220 of FIG. 1. As is shown by FIG. 2, the video compression module 220 comprises a video-input module (VIM) 222, a motion estimation unit 224, an encoder unit 226 and a video software processor 228. Each of these portions of the video compression module 220 is described in further detail herein below. It should be noted that the video software processor 228 is preferably utilized to provide interaction between the VIM 222, the motion estimation unit 224, and the encoder unit 226, as is described in further detail hereinbelow.

Video data to be compressed by the video compression module 220 is fed to the VIM 222. As is known in the art, individual video fields are provided in succession to allow proper compression of video data. The video field is provided to the VIM 222 via a numerical representation that represents brightness (luma or Y) and color (chroma, or Cb and Cr) of pixels within the video field, otherwise known as YUV or YCbCr data. In accordance with the present embodiment, each luma or chroma value is represented as an 8-bit digital number, and may have a value between 0 and 255, inclusive. Of course, each luma or chroma value may be represented as a digital number having more or less bits and may have a different value, however, the aforementioned is assumed for demonstration purposes.

Figure 3:
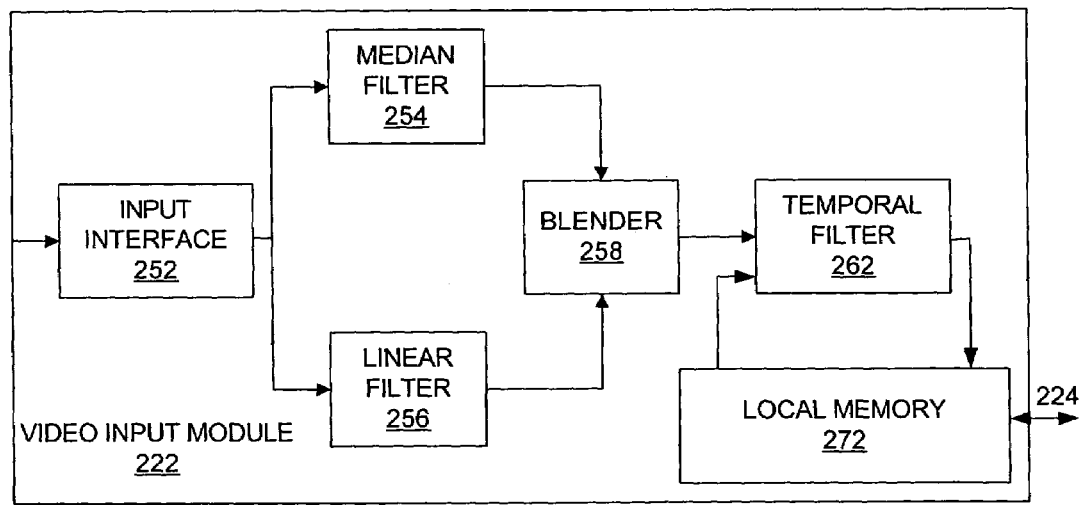
FIG. 3 is a block diagram illustrating an embodiment of a video input module shown in FIG. 2.

Processing performed by the VIM 222 is described in association with FIG. 3, which is a block diagram that further illustrates the VIM 222 of FIG. 2. As is shown by FIG. 3, video field data that is received by the VIM 222 is received via an input interface 252. Configuration of the video data may be performed in accordance with ITU-R Recommendation 656, which, as is known in the art, is an adopted standard used for uncompressed digital video. This standard uses a color sampling density that is half that of the brightness, known as "4:2:2" sampling.

From the input interface 252 the video field data is transmitted in parallel to a median filter 254 and a linear filter 256. The median filter 254 removes impulsive noise from the video field data. The linear filter 256 is preferably a low pass filter that attenuates high frequency noise and limits bandwidth. It should be noted that the order of filtering may differ in accordance with alternate embodiments of the disclosure. As an example, it may be beneficial to perform filtering by the median filter 254 first and by the linear filter 256 second.

After filtering has been performed by the median filter 254 and the linear filter 256, the remaining filtered video field data is transmitted to a blender device 258. The blender device 258 combines the remaining filtered video field data. Blending of the filtered video data may be performed in different percentages wherein a higher, lower, or equal amount of median filter 254 filtered video field data is utilized, in comparison to linear filter 256 filtered video field data. The percentage of filtered video field data from one filter as opposed to the other filter may be dependent upon the type of noise present in the video field data. In addition, the blender device 258 may be used to utilize only data that has been filtered by the linear filter 256 alone or the median filter 254 alone. Furthermore, the blender device 258 may be used to achieve a specified linear filter response in areas where the median filter 254 acts to pass the input through to the output, and to achieve a noise spreading operation where the median filter 254 produces an output different from the input.

Once combining is completed by the blender device 258, the video field data is transmitted to a temporal filter 262. One input to the temporal filter is from a local memory 272. The local memory 272 has stored therein pixels of previously filtered and combined video field data, and is therefore also connected to the output of the temporal filter 262. The stored pixels are used for comparison and filtering purposes by the temporal filter 262, as is described in detail hereinbelow.

Pixels of the previously filtered and combined video data field are transmitted to the temporal filter 262 from the local memory 272. The local memory 272 is also in communication with the motion estimation unit 224, as described below. The temporal filter 262 compares pixel values within the current filtered and combined video data field to spatially co-located pixel values from a previously filtered and combined video data field. The stored previously filtered and combined video data field is preferably of the same spatial parity (top field or bottom field) as the current filtered and combined video data field, although it is possible that pixels of a frame other than the immediately prior video data frame may be utilized.

During comparison performed by the temporal filter 262, the temporal filter 262 also performs averaging of pixel values. Averaging by the temporal filter 262 is performed by averaging the pixel values for a specific location in the current video data frame with the stored pixel values for the same location in the prior frame. Specifically, the luma (brightness), respectively chroma (color), values in the current video data field are averaged with the co-located luma, respectively chroma, values in the stored previously filtered and combined video data field. The values for luma and chroma are preferably represented by an eight-bit number. Of course, luma and chroma may be represented by a number that is represented by additional or fewer bits. As is known in the art, values for luma and chroma are represented by numerical values; therefore, averaging simply results in another numerical value.

Figure 4:
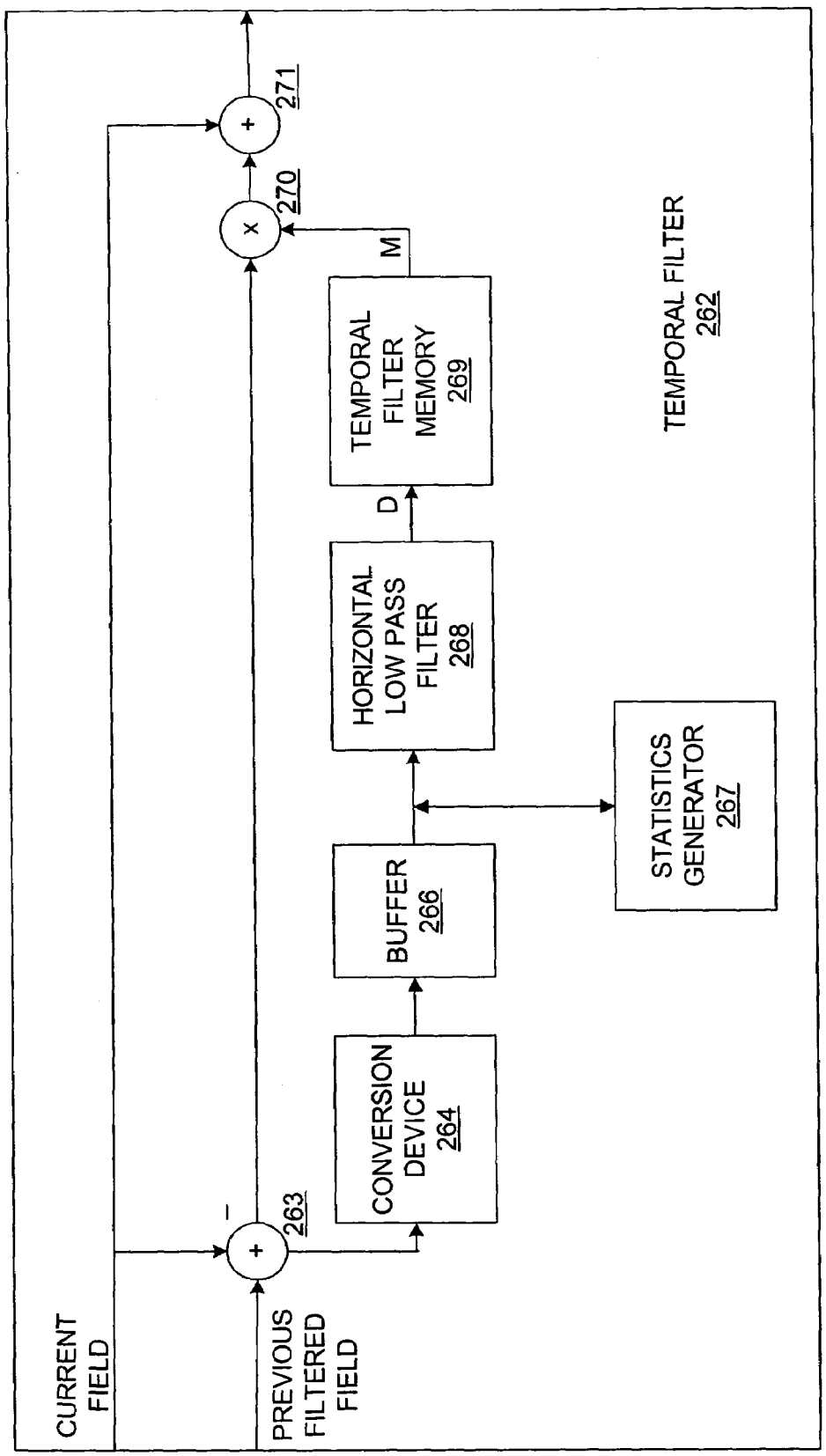
FIG. 4 is a block diagram illustrating an embodiment of a temporal filter of the video input module shown in FIG. 3.
Figure 5:
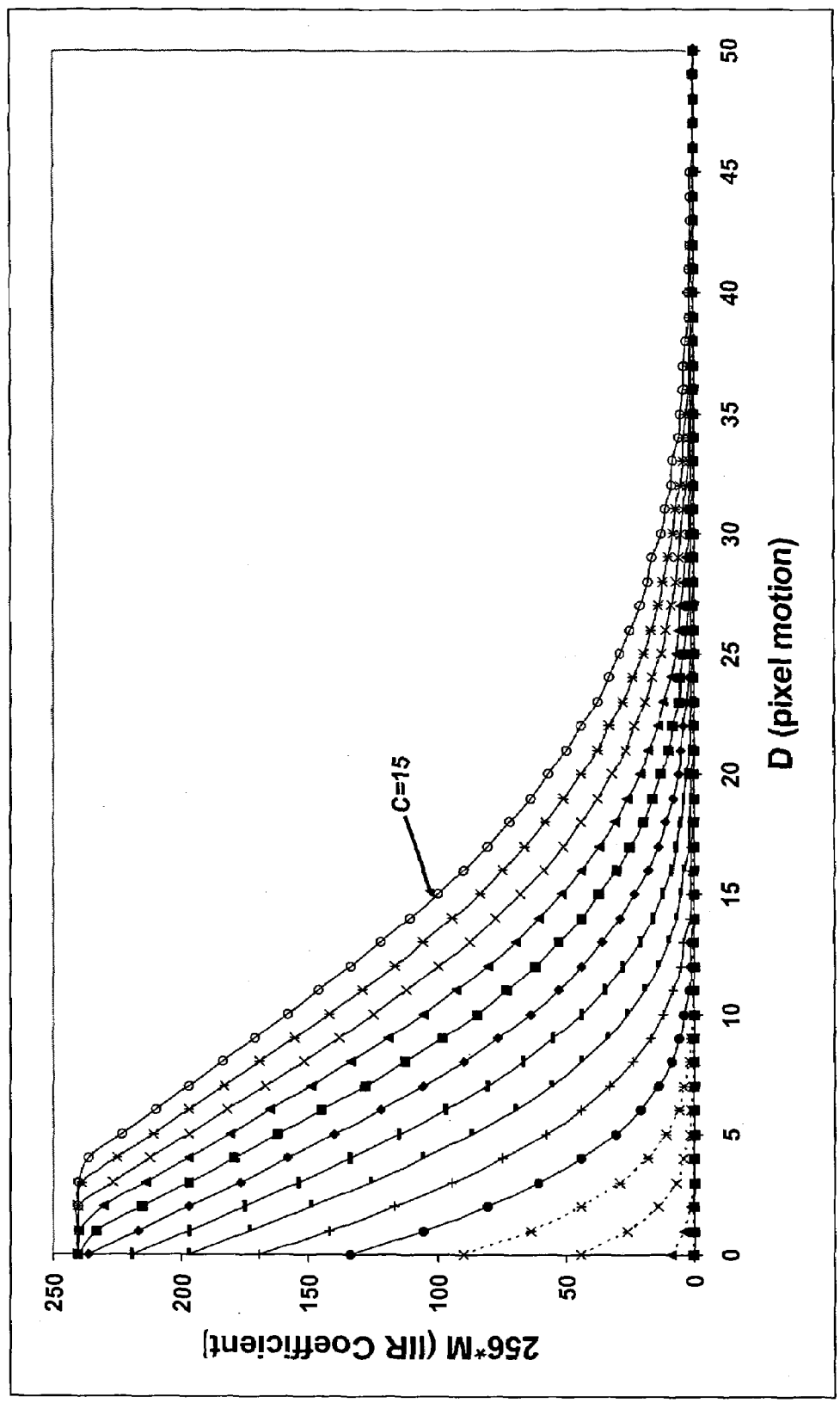
FIG. 5 is a graph that provides an exemplary illustration of a family of curves parameterized by temporal filter level $\chi$ from which one curve is to be selected based on an estimated noise level.

FIG. 4 is a block diagram further illustrating the temporal filter 262 of FIG. 3. The temporal filter 262 provides a weighted average of a previously filtered field and a current field. A conversion device 264, buffer 266, horizontal lowpass filter 268 and temporal filter memory 269 are utilized to determine how much weight of a previous filtered field should be used in averaging. The weight applied to the previous filtered field is represented by the variable M, and the weight applied to the current field is represented by 1-M. As is shown by FIG. 4, the pixel values of the current field, after filtering and combining, are subtracted from the pixel values for the previous field, wherein the pixel values for the previous field are stored within the local memory 272 (FIG. 3). The absolute value of the derived difference in pixel values is then calculated by a conversion device 264. Successive absolute difference values are stored within a buffer 266, which receives the absolute value differences. Alternatively, the absolute difference values may be stored within the local memory 272 (FIG. 3).

A horizontal low pass filter 268 provides a weighted average of successive pixel absolute differences. Specifically, the horizontal low pass filter 268 provides finite impulse response filtering on the successive pixel absolute differences. The number of pixel absolute difference values may differ. In accordance with one embodiment, five pixel absolute difference values, associated with a five-pixel region, are utilized for averaging purposes. The resulting value after finite impulse response filtering is denoted by the variable D, which is used as a measure of pixel motion.

Intuitively, if an object has either moved into or out of the five-pixel region associated with the value D during the time interval between the current field and the previous field, the value of D will be large. In such a case, the desired behavior of the temporal filter 262 is to select the current field, representing an unfiltered or only lightly filtered current version of the object represented by the five-pixel region. Selection of the current field is performed while ensuring that M is low when D is high. Blending the previous and current fields with a high value of M in the presence of excessive motion may result in "ghosting," in which two copies of the moving object would be visible in the current field, and/or blurring, in which the object appears to be smeared in the direction of motion.

Alternatively, if there is no motion during the time interval between the current field and the previous field, it is desirable to blend the current field with the previously filtered field so as to reduce the level of any noise that may be present through filtering. This kind of blending is accomplished by ensuring that M is high (preferably, near to one, or unity) when D is low. Experimentation shows that five pixel absolute difference for the weighted average represents a good trade-off between generating a high D value in the presence of moving objects and a low D value in the presence of only noise of low or moderate amplitude. It should, however, be noted that other sized regions may be utilized.

The variable D, or pixel motion, is used to determine the weight of the previous field in the weighted averaging process. In other words, the value of the variable D is utilized to determine what percentage of the previous field is incorporated into the present field. To make this determination, the value of the variable D is searched on the temporal filter memory 269. The temporal filter memory 269 comprises predefined values, represented herein by the variable M, which are located within a table. This table is sometimes referred to hereinbelow as a nonlinear transfer function (NLTF).

The temporal filter 262 utilizes the derived value of M to combine the current field data with the previous field data. Therefore, as mentioned hereinabove, a high value for M results in a higher percentage of the previous field data being combined with the present field, thereby resulting in combined video field data that is very similar to the video field data from a prior field. Clearly, a low value of M is desired when there is excessive motion represented by the current and prior video data field.

Conceptually, given the above description, $$M \in [0, 1],$$

that is m may take any value between zero and one, inclusive. Preferably, in accordance with the present embodiment, M may take one of 257 values in the set $$\left\{\frac{0}{256}, \frac{1}{256}, \ldots, \frac{256}{256}\right\}.$$

Furthermore, D may range from 0 to 255, inclusive. The values of M are utilized by the present noise reduction system 100 (FIG. 1) to transform a pixel motion level into a recursive filter coefficient utilized by the temporal filter 262 that provides a balance between noise reduction and motion artifacts. In general, with high amounts of motion (high D), there is a low weight of the previously filtered field utilized in filtering the present field.

The following example is provided to further demonstrate the relationship between the pixel motion (D) and the weight of the previous frame upon the current frame (M) in deriving resulting current video frame pixels. In accordance with the first example, a slowly moving video camera is utilized to record a stationary scene such as a room, while a large amount of noise affects the recording. This noise may be attributed to numerous different elements such as, but not limited to, low illumination levels, interference from other electronic devices, or the power source to the video camera. Due to the amount of noise affecting recording of the room, and the minimal amount of movement during recording, it is desirable to perform a large amount of filtering of noise to remove the abovementioned interference, i.e. to utilize a high percentage of video field data from the prior video field pixels (high M) when calculating the resulting current video field pixels. By utilizing a high percentage of the prior video field pixels (high M), the noise encountered by the present video field data during recording is averaged out with the previously filtered and stored pixel values of the previous video field. Further, since the camera is moving slowly, there is a large amount of similarity between the current frame and the prior frame so that a high value for M does not introduce excessive blurring or "ghost" effects.

By contrast, in accordance with a second example, the video camera is recording fast paced action such as a car race while minimal noise is encountered. Due to the vast amount of motion recorded, there is a large difference between the present video field and the prior video field. Specifically, due to the vast amount of motion, the co-located pixel values for the prior video field are quite different from the pixel values for the present video field. Therefore, it is not desirable to utilize a high percentage of the prior video field pixels during calculation of the resulting current video field pixels. Further, since there is minimal noise, utilization of a high percentage of the prior video field pixels for averaging is not necessary.

The noise reduction system 100 (FIG. 1) dynamically controls the M entries in the temporal filter memory 269 table (NLTF) over time in response to incoming video fields. In accordance with one embodiment, the dynamic control is performed once per field of video, although it can be done more or less frequently. The noise reduction system 100 performs this dynamic control by using noise and motion level information generated by the motion estimation unit 224 and statistics generator 267 during the course of operation, as is described herein below.

The principles behind dynamic control are as follows. The NLTF may be set at an optimum level for reducing a given level of noise, if an estimate of the prevailing noise level can be made during the course of operation of the noise reduction system 100 (FIG. 1). Using the noise estimate, a basic NLTF is selected, without considering whether motion is present, which would interact with the temporal filter 262, creating the above mentioned ghosting and blurring artifacts. This generally results in a temporal filter 262 that may cause motion artifacts, but that reduces noise very well. To address the issue of motion artifacts, a second step is performed for estimating the motion level and conditionally reducing the amount of filtering by modifying the basic NLTF. An example of a method for determining noise and motion estimates and using the estimates to dynamically control the temporal filter 262 is described below. It should be noted that other methods for determining noise and motion estimates are also possible.

The following describes a method embodiment for providing noise level estimation and also describes how the method is used to select a basic NLTF. Further, the noise measurement can be used to enable the noise reduction system 100 (FIG. 1) to select a gain matrix that efficiently reduces noise, as described below. In addition, a method embodiment by which the motion level is estimated is provided and how the motion level estimate is applied for modification of the NLTF.

Estimating Noise Level and Computing a Basic NLTF

Returning to FIG. 2, one purpose of the motion estimation unit 224 is to provide information regarding moving objects to the encoder unit 226 for video compression purposes. In addition, information that is also stored within the local memory 272 as a result of the motion estimation process is used by the present noise reduction system 100 (FIG. 1) to estimate noise levels. These estimated noise levels are then further utilized by the noise reduction system 100 to determine values of M that are stored within the temporal filter memory 269, thereby providing the basic NLTF. This process is described in detail herein below.

The motion estimation unit 224 first separates a first video frame, labeled as the current frame, into regions of pixels having a predefined size and number of pixels. Preferably, a sixteen pixel by sixteen pixel region is selected, although a region of different size may instead be selected. A region may be defined within a frame or within each of the two fields that comprise a frame. The motion estimation unit 224 then examines a second video frame, labeled as the reference frame, and compares the region for the current frame to determine what same-sized area of the reference frame is most similar to the current video frame region. Examination of the reference frame is performed by searching for a same-sized area having similar pixel values within the reference video frame. Since these pixel values are stored within the local memory 272, examination of the reference video frame is performed by searching the local memory 272. Numerous means may be utilized to perform this search, including, but not limited to, hierarchical motion estimation, phase-correlation, and full search motion estimation.

Two pieces of information are produced by the examination process for each region in the current frame. The first piece of information, known as a motion vector, is simply a vector of integers representing a spatial displacement in the horizontal and vertical direction of the most similar region in the reference frame, with respect to the region in the current frame. The motion represented by this integer vector may be of higher precision than integer pixel displacements. Specifically, with reference to one embodiment, the motion represented is of half-pixel precision.

The second piece of information produced by the examination process is a measure of the goodness of fit between the region in the current frame and the most similar region in the reference frame. This measure is denoted herein as the SAD, which is the sum of absolute pixel differences between the region in the current frame and the most similar region in the reference frame. Other measures, such as mean squared error, may be incorporated into the noise level estimation procedure.

The difference in pixel luma values between the 16×16 region in the current video frame and the similar 16×16 region in the reference frame may be attributed to numerous elements, one of which is noise. Therefore, since the motion estimation unit 224 determines similar pixel regions, as has been described hereinabove with reference to the determination of motion, and since the difference between these regions may be attributed to noise, the motion estimation unit 224 may be utilized for estimating noise.

Specifically, to estimate noise, the present system keeps track of the sum of absolute differences of pixel values for each current region/similar reference region pair. The sum of absolute differences provided by the motion estimation unit 224 is also referred to herein as a mean absolute difference (MAD) score. The MAD is simply a scaling down of the SAD. Therefore, in accordance with the present illustration of use of a 16×16 pixel region, each region is associated with one MAD score.

For each current/reference frame pair, the lowest MAD score is determined from all computed MAD scores. In an alternative embodiment, the lowest MAD score that is not zero is determined from all computed MAD scores. The lowest MAD score is referred to hereinafter as a minMAD score. Since incurred noise is different for each video frame, the minMAD score is first temporally smoothed. In accordance with one embodiment, this first smoothing is done with an infinite impulse response filter. A second nonlinear smoothing is performed over a series of successive frames, preferably, although not limited to, three frames. In the second smoothing the lowest minMAD score over the three frames is determined. Since the minMAD is indicative of the best match between a region from a current frame and a same-sized area in a reference frame and since there is likely to be at least one good matching region between two frames in a video scene, the minMAD is a good indicator of noise.

A noise-based determination of the basic NLTF using minMAD is performed by using the following parameterized function:

$$TF(D)=\min\{\alpha,\beta \times e^{(-0.5((D+8)/(\chi+3))^2)}\} \quad \text{(Eq. 1)}$$

The variable D is the output of the horizontal lowpass filter 268 in FIG. 4. Hereinabove, the variable $\alpha$ limits the infinite impulse response coefficient, the variable $\beta$ determines the area of the M vs. D curve, and the variable $\chi$ determines the rate at which the M vs. D decays to $\chi$ as D increases. In accordance with one embodiment, the values of $\alpha$ and $\beta$ are fixed at $$\frac{240}{256}$$

and $$\frac{325}{256},$$

respectively, and the value of $\chi$ may be one of several possible values, referred to herein as temporal filter levels. Specifically, there are 31 temporal filter levels (0, 1, . . . , 30) in accordance with the preferred embodiment. One skilled in the art will appreciate that other values and levels may be utilized.

A family of curves parameterized by $\chi$ may be generated, as illustrated in FIG. 5. Functional form of the curve parameterized by $\chi$ may be determined by computer-based fitting to a hand-tuned NLTF. Other functional forms of similar effectiveness may also be utilized. Similarly, many different families of curves may be derived from a suitably parameterized functional form without deviating from the intent of the present disclosure.

The temporally and nonlinearly smoothed minMAD noise estimate is converted to the temporal filter level $\chi$, using the following linear mapping:

$$\chi = \frac{3}{4} \times \text{noise} + 4 \quad \text{(Eq. 2)}$$

Estimating Motion Level and Modifying the Basic NLTF to Form a Final NLTF

Unfortunately, if there is a large amount of video motion or an extreme difference between fields, such as during a change of scenes, it is not desirable to utilize a prior video field in the derivation and filtering of a current field. If the prior video field were used in spite of these extreme differences between the present field and the prior field, remnants of the prior field would be incorporated into a completely different video scene, also referred herein above as ghosting artifacts. Therefore, the VIM 222 is utilized to determine the amount of scene motion, denoted herein as the motion level, in order to mitigate ghosting artifacts by limiting the amount of temporal filtering performed during excessive motion and scene changes. This motion level is used to modify the basic NLTF to prevent these artifacts. The following provides an example of a method embodiment utilized to determine motion level and illustrates use of the method to modify the basic NLTF.

For the purposes of noise reduction, motion level may be represented by the following equation:

$$\text{motion level} = \frac{SADhist}{gSAD} \quad \text{(Eq. 3)}$$

In this equation, gSAD is the sum of absolute pixel differences for the entire field and is defined below, while SADhist represents the sum of absolute pixel differences not for the entire field, but only for those pixels whose absolute pixel difference exceeds a threshold. Labeling pixel i in the current field $y_n(i)$ and pixel i in the previous spatially co-located field $y_{n-1}(i)$, SADhist is defined as:

$$SADhist \equiv \sum_{i=0}^{N-1} |y_n(i) - y_{n-1}(i)| \times I(|y_n(i) - y_{n-1}(i)| > \text{threshold}), \quad \text{(Eq. 4)}$$

where I(condition) is the indicator function, and equals 1 if condition is true and 0 otherwise. However, since SADhist is not computed herein, it is estimated. SADhist is estimated using measurements computed by the statistics generator 267, specifically gSAD, maxZoneSAD and histCount, which are defined and described hereinbelow.

For each incoming video field, the statistics generator 267 computes a first measurement to be the sum of absolute pixel differences between the current incoming field and the previous spatially co-located filtered field from local memory 272. This sum is labeled gSAD hereinbelow. Labeling pixel i in the current field $y_n(i)$ and pixel i in the previous spatially co-located field $y_{n-1}(i)$, gSAD is given by the equation:

$$gSAD = \sum_{i=0}^{N-1} |y_n(i) - y_{n-1}(i)|, \quad \text{(Eq. 5)}$$

where N is the number of pixels in a field.

A second measurement produced by the statistics generator 267 is a maxZoneSAD, which is the maximum sum of absolute differences between the present field and the previous spatially co-located field, over a zone. A zone is a rectangular region of the field that is programmable in size by the present noise reduction system 100 (FIG. 1). As a non-limiting example, the zone may be sixteen pixels by six pixels in size, although it may be of different proportions. It should be noted that the larger the size of the zone, the more difficult it is to detect small moving objects within a video. After designation of the proportions of a zone, the sum of absolute differences over each individual zone is determined. The value of the sum in the zone with the maximum sum is then designated as maxZoneSAD. Assuming there are M zones labeled $Z_m$, m=0, . . . , M−1, maxZoneSAD is given by the equation:

$$\text{maxZoneSAD} = \max_{m=0,\ldots,M-1} \left\{ \sum_{i \in Z_m} |y_n(i) - y_{n-1}(i)| \right\}. \quad \text{(Eq. 6)}$$

A third measurement produced by the statistics generator 267 is a histCount, being the number of times the pixel absolute difference is above a specified threshold. The threshold is programmable, as is described in detail hereinbelow.

The following equation estimates SADhist using gSAD, histCount and maxZoneSAD:

$$SADhist \approx (A \cdot gSAD/N_{field} + B \cdot \max ZoneSad/N_{zone} + C) \cdot histCount \quad \text{(Eq. 7)}$$

where $N_{field}$ is the number of pixels in a field, $N_{zone}$ is the number of pixels in a zone, and A, B, and C are regression coefficients. Since luma and chroma statistics exhibit different levels of sensitivity to motion, different histogram threshold and different sets of regression coefficients A, B and C for luma and chroma statistics are used. The following provides an example of values that may be utilized in the above-mentioned equation 7 for purposes of illustration. It should be noted, however, that other values may be utilized.

A histogram threshold of 20 for luma and 10 for chroma works well for low to medium noise. Regarding the regression coefficients, for luma, A=0.557838595, B=0.126760734 and C=21.35959058; and for chroma, A=0.196923005, B=0.092330113 and C=12.00067648. It should be reiterated that SADhist is not computed in one embodiment of the actual noise reduction system 100 (FIG. 1).

Combining equations 3 and 7 results in the following equation that is utilized to derive a measure of motion level between fields:

$$\text{motion level} = \frac{(A \cdot gSAD/N_{field} + B \cdot \text{maxZoneSad}/N_{zone} + C) \cdot histCount}{gSAD} \quad \text{(Eq. 8)}$$

It should be noted that a high resulting value for motion level indicates that there is a large amount of motion between the present field and the previous field, and that consequently, less temporal filtering should be applied.

Given the above estimate of motion level, motion-based limiting of the M values is performed, in accordance with one embodiment, by using the following windowing function:

$$W(D, L) = \frac{\exp(a - b\exp(D - L))}{\exp(a - b)} \quad \text{(Eq. 9)}$$

Herein, the variable D is pixel motion, as defined hereinabove, and the variable L is a temporal filter 262 limit value.

In accordance with the present example, the constants a and b are selected as a=0.001512 and b=2.17×10⁻⁸. The temporal filter limit L is then related to the motion level estimate using the following equation:

$$L=(24/\text{motion level})-18 \quad \text{(Eq. 10)}$$

Final NLTF Based on Noise and Motion Level Estimates

The following equation is utilized to compute M values given a temporal filter level $\chi$ and a motion limit value L:

$$M=\min\{A, W(D,L) \times B\exp(-0.5((D+8)/(\chi+3))^2)\} \quad \text{(Eq. 11)}$$

In addition to the above considerations regarding the automatic changing of the temporal filter memory 269, in some embodiments, it may be beneficial to completely disable temporal filtering (i.e. set all M values to 0) immediately after a change of scene is detected and then to resume normal operation one frame later.

In the presence of high noise levels, the temporal filter 262 alone may be insufficient for noise removal. An example of such high noise levels includes "snow" that appears when a television is tuned to an unused channel. In such a situation, the linear filter 256 may be programmed to perform lowpass filtering to further reduce spatial bandwidth of the incoming video field, thus reducing high-frequency noise. Unfortunately, lowpass filtering also reduces picture resolution, thereby resulting in this option being used in extremely noisy circumstances in which the tradeoff between resolution and decreased noise is acceptable.

A family of sets of coefficients for the linear filter 256, for each of the horizontal luma, vertical luma, horizontal chroma, and vertical chroma filters, is preferably utilized. As an example, there may be a family of 16 sets of coefficients. Given a linear filter 256 level S in the range of 0 to 15, inclusive, the horizontal luma, vertical luma, horizontal chroma, and vertical chroma filters have a cutoff of approximately 0.5+0.05(16−s) in normalized frequency. Preferably, the luma and chroma filters are both 9-tap horizontal FIR linear phase filters, with S controlling all filters. Since one skilled in the art would understand how to design and/or develop such filters, further discussion is not provided herein.

A change in the linear filter 256 level S is readily perceived in the output video as a change in the "softness" or level of detail. Unfortunately, if the value of S changes quickly from field to field, the results of the change may be quite displeasing. To avoid or mitigate this undesirable change S is smoothed. Preferably, a first-order infinite impulse response (IIR) filter is utilized for smoothing purposes, although other filters may be substituted. In addition, it is possible and beneficial to reduce the frequency with which a change in the linear filter 256 level is updated from every field to a lower frequency such as every third frame.

The noise level estimate described hereinabove is converted to the linear filter level S using linear mapping. As an example the following linear mapping may be utilized, which also shows IIR smoothing by a factor of $\alpha$.

$$S=\alpha S_{old}+(1-\alpha)(0.324166 \cdot \text{noise}-1.792115) \quad \text{(Eq. 12)}$$

It should be noted that, unlike the temporal filter 262, the operation of the linear filter 256 is not affected by a scene change.

It should also be noted that dynamic control of the linear filter 256 and the temporal filter 262 can be performed separately or simultaneously, and that the dynamic control of the temporal filter 262 can be performed on the basis of both noise level and motion level or on the basis of one or the other. To provide maximum benefit, the noise reduction system 100 (FIG. 1) uses dynamic control of both the linear filter 256 and the temporal filter 262 on the basis of both noise level and motion level estimates.

Gain Matrix

Figure 6:
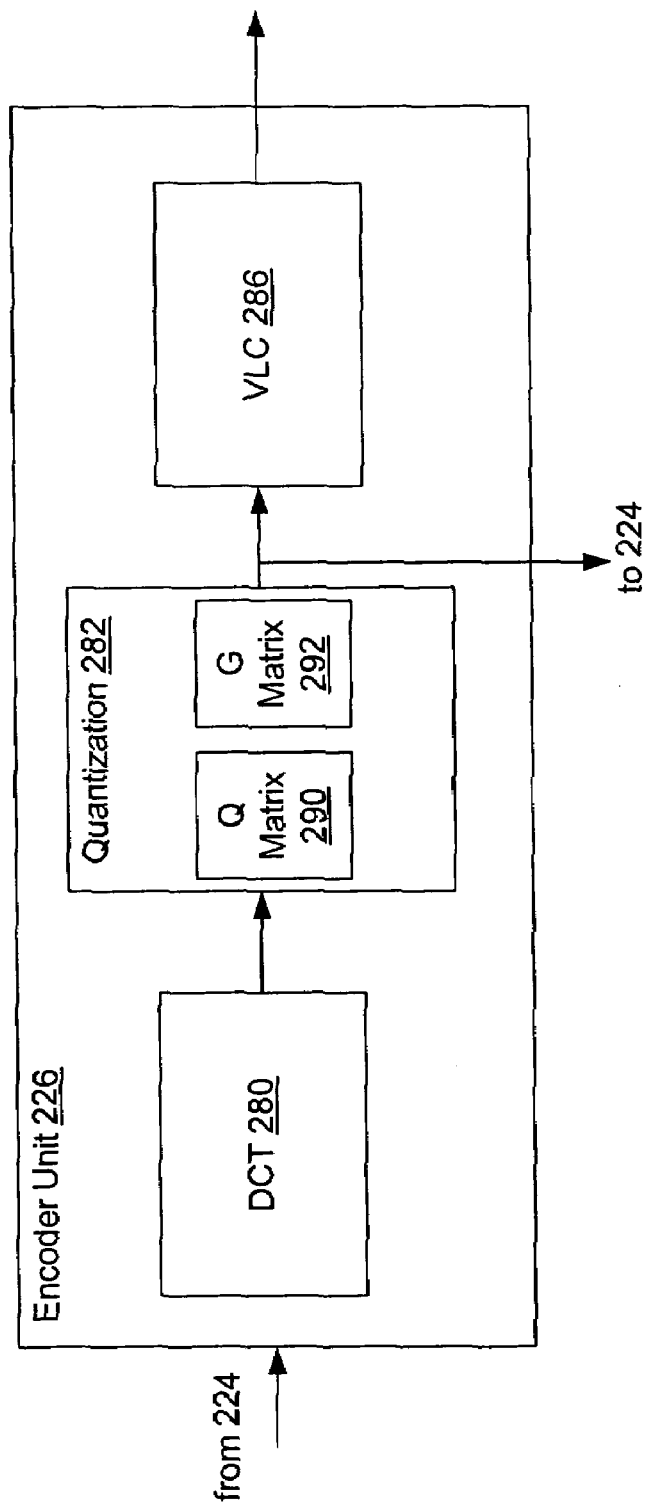
FIG. 6 is a block diagram of an embodiment of an encoder unit shown in FIG. 2.

FIG. 6 shows a further view of the encoder unit 226. The encoder unit 226 includes a DCT module 280, quantization module 282, which includes a quantization (Q) matrix 290 and a gain (G) matrix 292, and a variable length coding (VLC) module 286. With simultaneous reference to FIG. 2, the encoder unit 226 receives a residual and a noise estimate from the motion estimation unit 224 when processing a motion-compensated frame. The encoder unit 226, with the cooperation of local memory (not shown), performs a transformation (e.g., of 8×8 blocks) from the spatial domain to the frequency domain (horizontal and vertical frequency) at the DCT module 280. The DCT module 280 employs a 2-dimensional DCT. The generated DCT coefficients represent how much of a given horizontal/vertical frequency pair is present in a residual image, and thus comprise separable vertical and horizontal one dimensional DCTs. In one embodiment, the DCT coefficients are presented to the quantization module 282, which quantizes the DCT coefficients to reduce the number of bits used to represent each coefficient. During the quantization process, the Q matrix 290 and G matrix 292 are employed, as described below. From the quantization module 282, the quantized DCT coefficients are passed to the VLC module 286, as well as being fed back to the motion estimation unit 224.

As indicated above, the quantization module 282 includes the Q matrix 290 and the G matrix 292. The G matrix 292 receives inputs corresponding to gain and shape parameters, and may also receive inputs corresponding to noise level measurements for the purpose of adjusting the gain parameter. During the quantization process, the 2-D DCT transform coefficients received from the DCT module 280 are multiplied element by element by the Q matrix 290 and then divided element by element by the G matrix 292. A G matrix 292 that contain all ones effectively results in the Q matrix 290 alone being implemented in the quantization process, and thus results in a process that is equivalent to a normal MPEG process. In an alternate embodiment, the G matrix 292 is applied first to the DCT coefficients followed by application of the Q matrix 290.

One objective is to weight the DCT coefficients of the G matrix 292, thus resulting in a G matrix 292 that contains values other than 1. The G matrix 292 can be factored into a gain-shape representation $G(i,j)=g F(i,j,s)+C$, where g is the gain parameter, F is the shape function, s is the shape parameter, C is a constant offset, and i and j are horizontal and vertical frequency indices, respectively, that vary from 0 to 7, inclusive.

An example of a non-flat G matrix 292 is $G(i,j)=g \cdot (1+s \cdot (i+j))$. The shape parameter s affects how these weights G(i,j) vary according to a given horizontal frequency i and vertical frequency j. For instance, as the shape parameter s is adjusted from 0 to a higher value, the shape of the G matrix 292 changes from flat to highly frequency selective. A flat shape indicates that every coefficient of the G matrix 292 has the same value. The shape parameter s is significant in that it controls frequency selectivity. That is, it may be desirable to decrease the noise more at high frequencies since there's generally more noise at high frequencies in video.

The gain adjustment may be an automatic adjustment based on the noise level measurement received from the motion estimation unit 224 (FIG. 2) (although user adjustment is also possible in lieu of or in cooperation with the noise measurement input). For example, with a high noise level detected, the gain parameter may be increased proportionally. If the detected noise level is low, the gain parameter may be automatically reduced proportionally. The shape and gain parameters may impact the image quality. For instance, too high of a gain parameter may result in artifacts (e.g., if the shape parameter is not appropriate in terms of signal and noise). The noise measurement process described above ties in with the G matrix 292, since if a signal is clean, applying an aggressive G matrix 292 may provide less than desirable results. If there is significant noise present, a more aggressive G matrix 292 may be employed. Thus, the G matrix 292 controls the amount of noise reduction based on the frequency content of the image, and the shape parameter determines the type of frequency selectivity.

Figure 7:
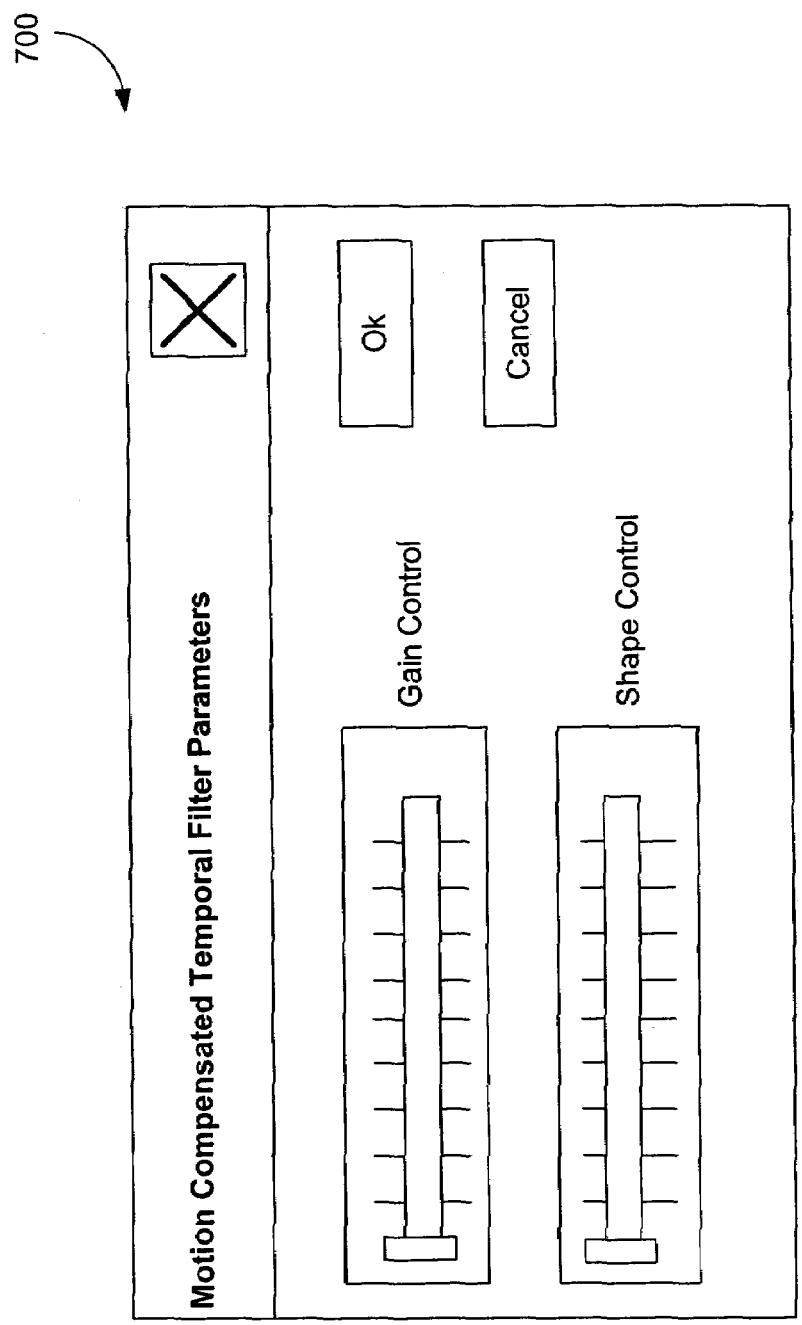
FIG. 7 is a screen diagram of an exemplary user interface used to adjust a shape and gain parameter in the noise reduction system of FIG. 1.

The gain parameter and/or the shape parameter may be user and/or machine adjustable. For instance, a computer or DVD player may have a graphics user interface (GUI) and associated GUI controls that enable the user to make adjustments. Referring to FIG. 7, shown is an exemplary GUI 700 that may be presented to a user to enable adjustment of the gain and shape parameters. Through the shape control (shape parameter), a user may choose a shape parameter over a range, for example 0-100. The gain control (gain parameter) likewise can be adjusted over a defined range, such as 0-100%.

In operation, the G matrix 292 may be stored in memory (either local or memory 206, FIG. 2). For example, various functional forms may be stored in memory and implemented by the quantization module 282. Equations 13 and 14 represent two gain matrices that may be selected from a family of matrices:

$$G(i, j) = g[(1-s)i + s\sqrt{j}] + 1, \qquad (\text{Eq. 13})$$

where s is a shape parameter having values between 0 and 1 and g is a gain parameter having values between 0 and 0.25. Another matrix may be fashioned as follows:

$$G(i, j) = g[\exp(s \cdot \text{scan}[i][j]) - 1] + 1, \qquad (\text{Eq. 14})$$

where s ranges from 0 to 0.05, g ranges from 0 to 1, and $$\text{scan}[i][j] = \begin{bmatrix} 0 & 4 & 6 & 20 & 22 & 36 & 38 & 52 \\ 1 & 5 & 7 & 21 & 23 & 37 & 39 & 53 \\ 2 & 8 & 19 & 24 & 34 & 40 & 50 & 54 \\ 3 & 9 & 18 & 25 & 35 & 41 & 51 & 55 \\ 10 & 17 & 26 & 30 & 42 & 46 & 56 & 60 \\ 11 & 16 & 27 & 31 & 43 & 47 & 57 & 61 \\ 12 & 15 & 28 & 32 & 44 & 48 & 58 & 62 \\ 13 & 14 & 29 & 33 & 45 & 49 & 59 & 63 \end{bmatrix}.$$

Here, scan[i][j] is the alternate scan matrix of MPEG-2, and the intention of Eq. 14 is to perform the frequency selectivity along the coefficient scan of a target video compression standard, in this case, MPEG-2. Of course, other matrices may be devised with varying shape and gain parameters. A function call may be made by the quantization module 282 to compute the G matrix 292, and once computed, it can be used whenever a block is quantized.

In one implementation, the DCT coefficients may be multiplied by the Q matrix 290 and divided by the G matrix 292 in real time. In another implementation, the order of operation is reversed between the Q matrix 290 and the G matrix 292. In yet another implementation, the G matrix 292 can be combined with the Q matrix 290, and the quotient of the two matrices stored in memory or programmed in a hardware register. The Q matrix 290 and/or the G matrix 292 can be in local memory, memory 206, or inside the registers in the chip (e.g., in static memory).

In some embodiments, the G matrix 292 may be applied only when the block being quantized employs motion-compensated prediction. The effect of applying the G matrix 292 is to attenuate the residual block used to reconstruct the motion-compensated frame. If the block motion is well estimated by the motion estimation unit 224, then the effect is a reduction of noise in the direction of the estimated motion. However, if the block motion is not well estimated, artifacts may be introduced by applying the G matrix 292. In one embodiment, the residual block energy is compared to a threshold T, and the G matrix 292 is applied only when the residual block energy is less than the threshold T. The threshold T may be determined to be a proportional to the noise level estimate provided by motion estimation unit 224.

It should be emphasized that the above-described embodiments, particularly, any "preferred" embodiments, are merely possible examples of implementations, merely set forth for a clear understanding of the principles of the disclosed systems and methods. Many variations and modifications may be made to the above-described embodiment(s) without departing substantially from the disclosed principles. All such modifications and variations are intended to be included herein within the scope of this disclosure.

What is claimed is:

1. A noise reduction method, comprising:
processing input video data to produce a residual signal;
transforming the residual signal to produce transform coefficients; and
applying the transform coefficients to a quantization matrix and a configurable gain matrix to provide a frequency-selective weighting of the transform coefficients having a gain that is responsive to noise levels of the input video data; and
outputting the frequency-selective weighting of the transform coefficients as output video data.

2. The method of claim 1, further including the steps of determining a motion level through a comparison of pixels in two temporally different image regions; and setting a gain of the configurable gain matrix as a function of the determined motion level, wherein the two temporally different image regions are connected by a motion vector and transforming comprises 2-dimensional discrete cosine transforming.

3. The method of claim 1, wherein applying comprises multiplying the transform coefficients element by element by the quantization matrix to produce products, wherein the products are divided element by element by the configurable gain matrix to produce quotients.

4. The method of claim 1, further comprising receiving configurable gain and shape parameters to weight the configurable gain matrix.

5. The method of claim 1, further comprising manually adjusting at least one of the gain parameters and the shape parameters.

6. The method of claim 1, further comprising automatically adjusting the gain parameters based on the noise information.

7. A noise reduction system, comprising:
an encoder comprising quantization logic configured with a quantization matrix and a gain matrix that is configurable based on gain and shape parameters, the quantization logic configured to apply transform coefficients produced from a residual of input video data to the quantization matrix and the gain matrix to generate a frequency-selective weighting of the transform coefficients having a gain that is responsive to noise levels of the input video data.

8. The system of claim 7, wherein the encoder module further comprising a transform module configured to transform the residual to the frequency domain.

9. The system of claim 7, further comprising a motion estimation module configured to generate noise information based on noise level estimates and motion detection.

10. The system of claim 9, wherein the quantization logic is configured to receive the noise information and adjust the gain parameter based on the noise information.

11. The system of claim 7, wherein the quantization logic is configured to receive the gain and shape parameters as adjusted by a user.

12. The system of claim 7, wherein the encoder module is configured in hardware.

13. The system of claim 7, wherein the encoder module is configured in software.

14. The system of claim 7, wherein the encoder module is configured in software and hardware.

15. A noise reduction system, comprising:
means for processing input video data to produce a residual signal;
means for transforming the residual signal to produce transform coefficients; and
means for applying the transform coefficients to a quantization matrix and a gain matrix adjustable based on configurable gain parameters and shape parameters to provide a frequency-selective weighting of the transform coefficients having a gain that is dependent on noise levels of the input video data.

16. The system of claim 15, wherein the means for transforming comprises a discrete cosine transform module.

17. The system of claim 15, wherein the means for applying comprises a quantization module having a quantization matrix and the gain matrix.

18. The system of claim 15, further comprising means for providing noise level and motion level estimates.

19. The system of claim 15, further including
means for determining a motion level through a comparison of pixels in two temporally different image regions; and
means for setting a gain of the configurable gain matrix as a function of the determined motion level, wherein the two temporally different image regions are connected by a motion vector.

20. The system of claim 19, further including means for providing noise level and motion level estimates, and wherein the means for transforming includes a discrete cosine transform module and the means for applying includes a quantization module having a quantization matrix and the gain matrix.

21. The method of claim 2, further including the steps of:
receiving configurable gain and shape parameters to weight the configurable gain matrix;
manually adjusting at least one of the gain parameters and the shape parameters; and
automatically adjusting the gain parameters based on the noise information.

22. The system of claim 7, further including
logic for determining a motion level through a comparison of pixels in two temporally different image regions; and
logic for setting a gain of the configurable gain matrix as a function of the determined motion level, wherein the two temporally different image regions are connected by a motion vector and the quantization logic is further configured to transform the coefficients using 2-dimensional discrete cosine transforming.

23. The system of claim 22, further including
a transform module configured to transform the residual to the frequency domain; and
a motion estimation module configured to generate noise information based on noise level estimates and motion detection; and wherein the quantization logic is configured to receive the noise information and to adjust the gain parameter based on the noise information and to receive the gain and shape parameters as adjusted by a user.

* * * * *